(12) United States Patent
Xue et al.

(10) Patent No.: US 11,640,383 B2
(45) Date of Patent: May 2, 2023

(54) SYSTEMS AND METHODS FOR MANAGING A SHARED DATABASE

(71) Applicants: Xun Xue, Markham (CA); Chong Chen, Richmond Hill (CA); Per-Ake Larson, Etobicoke (CA); Robin Grosman, Markham (CA)

(72) Inventors: Xun Xue, Markham (CA); Chong Chen, Richmond Hill (CA); Per-Ake Larson, Etobicoke (CA); Robin Grosman, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 881 days.

(21) Appl. No.: 16/192,514

(22) Filed: Nov. 15, 2018

(65) Prior Publication Data

US 2020/0159845 A1 May 21, 2020

(51) Int. Cl.
*G06F 16/23* (2019.01)
*G06F 16/21* (2019.01)

(52) U.S. Cl.
CPC ........ *G06F 16/2343* (2019.01); *G06F 16/219* (2019.01); *G06F 16/2358* (2019.01); *G06F 16/2365* (2019.01)

(58) Field of Classification Search
CPC .... G06F 16/27; G06F 16/273; G06F 16/2343; G06F 16/275; G06F 16/2336; G06F 16/2358; G06F 16/2365
See application file for complete search history.

(56) References Cited

U.S. PATENT DOCUMENTS

| | | | |
|---|---|---|---|
| 7,962,458 B2 * | 6/2011 | Holenstein | G06F 16/2343 707/704 |
| 2007/0219999 A1 | 9/2007 | Richey et al. | |
| 2015/0242247 A1 | 8/2015 | Chessell et al. | |
| 2015/0269185 A1 * | 9/2015 | Fang | G06F 16/00 707/703 |
| 2016/0350357 A1 * | 12/2016 | Palmer | G06F 16/2315 |
| 2017/0075917 A1 * | 3/2017 | Heemskerk | G06F 8/71 |
| 2018/0322158 A1 | 11/2018 | Zhang et al. | |
| 2019/0129894 A1 | 5/2019 | Peng | |
| 2019/0179930 A1 * | 6/2019 | Vandiver | G06F 16/2365 |

FOREIGN PATENT DOCUMENTS

| | | |
|---|---|---|
| CN | 101405735 A | 4/2009 |
| CN | 107577678 A | 1/2018 |
| CN | 108363806 A | 8/2018 |

\* cited by examiner

*Primary Examiner* — Grace Park
(74) *Attorney, Agent, or Firm* — BCF LLP

(57) ABSTRACT

Methods and systems are described for managing a shared database. One or more processing nodes may access a shared database. A common log node may manage the shared database. The common log node may validate database operations requested by the one or more processing nodes. During validation, the common log node may detect conflicts that occur between database operations requested by the one or more processing nodes.

20 Claims, 9 Drawing Sheets

SYSTEMS AND METHODS FOR MANAGING A SHARED DATABASE

BACKGROUND

Database systems are typically configured to store data that may readily be accessed by one or more processing nodes. Depending on the operations and conditions, the processing nodes may be permitted to read and/or write a database of the database system. However, for a variety of reasons, such as, for example, communication access issues, communication network congestion issues, remote location-based delays, etc., processing nodes often experience significant delays in consummating their requests to perform operations on records of pages of the database. The processing nodes may be located in various different locations, such as in locations in which there is a significant communication delay between a processing node and storage nodes in which the database system is implemented. As a result, conflicts often occur when more than one processing node attempts to write to a same portion of the database in a concurrent manner. To prevent and/or resolve conflicts that occur between processing nodes attempting to concurrently access a database system, what is proposed is a configuration that effectively minimizes processing delays, reconciles conflicts, and effectively executes read/write access to the database system to successfully perform desired operations.

SUMMARY

The following summary is for illustrative purposes only, and is not intended to limit or constrain the detailed description. The following summary merely presents various described aspects in a simplified form as a prelude to the more detailed description provided below.

A database such as a relational database, may be used to store data. The database may be a shared database that is implemented on storage nodes that are accessed by one or more processing nodes, each processing node having read and/or write privileges for the database. An intermediate system, hereinafter referred to as a "common log node", may coordinate transactions between the processing nodes and the storage nodes that implement the database. Each transaction may comprise one or more requests to perform modify operations on records of pages of the database. The intermediate system may comprise software and/or hardware configured to coordinate the transactions. The common log node may receive requests from the processing nodes to perform modify operations on records of pages of the database. The pages may be stored in the database implemented on storage nodes. The common log node may validate the operations and/or cause the operations to be sent to a storage node for execution on the database.

Conflicts may occur when multiple processing nodes send requests to perform modify operations on records of the same page of the database concurrently. The common log may detect and/or prevent these conflicts. If a conflict is detected by the common log, the processing nodes and/or the common log may reverse, or undo, a transaction corresponding to the conflict.

The common log node and/or the processing nodes may maintain locks corresponding to pages of the database. Each lock may be assigned to a single processing node. The processing node that is assigned the lock has the exclusive right to perform operations on records of the page corresponding to the lock, while other processing nodes are not permitted to perform modify operations on records of the page corresponding to the lock. The other processing nodes may be permitted to read the page corresponding to the lock. After a transaction holding a lock has been committed or been reversed, i.e., aborted, the lock may be released.

According to one aspect of the present disclosure, there is provided a method that may comprise receiving a request to perform a modify operation on a record of a page of a database. The request may be received by a first computing device, such as a common log node. The request may be received from a second computing device, such as a processing node. The request may comprise an identifier of a page. The request may comprise a base version number corresponding to the page. The request may comprise an identifier of a transaction corresponding to the modify operation. The method may comprise determining whether a lock corresponding to the page has been assigned. The method may comprise, after determining that the lock has been assigned, determining whether the lock is assigned to a second computing device. The method may comprise comparing the base version number to a latest validated version number of the page. The method may comprise, after determining that the lock has been assigned to the second computing device, and after determining that the base version number is equivalent to the latest validated version number of the page, transmitting an indication that the modify operation has been validated.

According to another aspect of the present disclosure, there is provided a method that may comprise receiving a request to perform a modify operation on a record of a page of a database. The request may be received by a computing device. The request may comprise an identifier of a page. The request may comprise a base version number corresponding to the page. The request may comprise an identifier of a transaction corresponding to the modify operation. The method may comprise determining whether a lock corresponding to the page has been assigned. The method may comprise creating a lock corresponding to the page. The method may comprise comparing the base version number to a latest validated version number of the page. The method may comprise, after determining that the base version number is equivalent to the latest validated version number of the page, transmitting an indication that the modify operation has been validated.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

Figure 1:
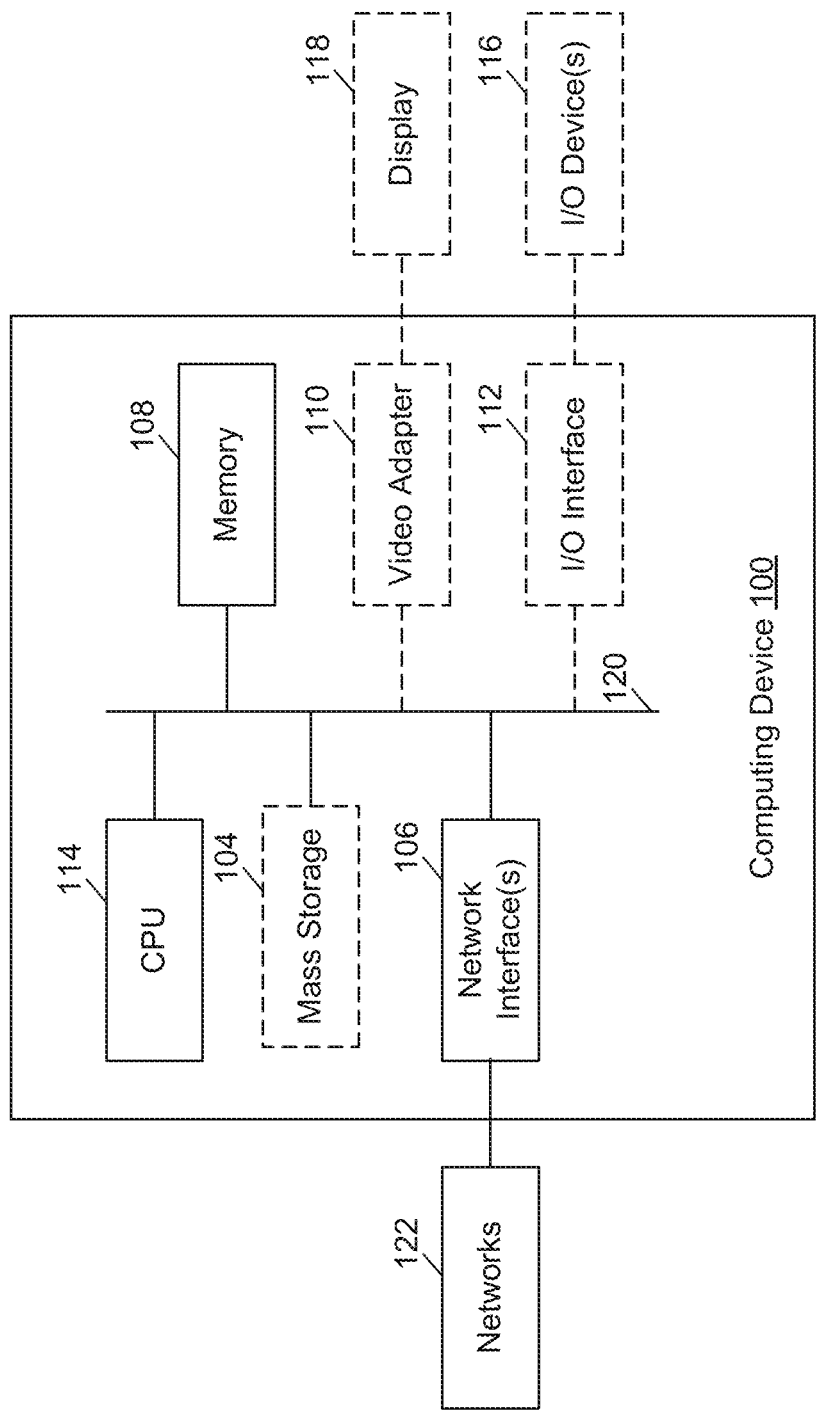
FIG. 1 is a block diagram of a computing system that may be used for implementing devices and methods in accordance with representative embodiments described herein.

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural or functional modifications may be made, without departing from the scope of the present disclosure.

A database, such as a relational database, may be used to store data and/or access stored data. The database may be managed and accessed using a relational database management system (RDBMS), such as a structured query language (SQL) database management system. The database may be a shared database, in which multiple processing nodes may access the database. The processing nodes may comprise read-only processing nodes, write-only processing nodes, read/write processing nodes, or any combination thereof. The processing nodes may be located at various distances from storage nodes that the database is implemented on, which may result in communication delays between the processing nodes and/or the database. The database itself may be distributed physically. For example different parts of the database may be located on different storage nodes. Some parts of the database may be closer to a processing node than other parts of the database.

The database stores data in pages, where each page includes one or more records of stored data. Each of the processing nodes may share a single view of the pages of the database. In other words, regardless of whether a page of the database is accessed from a first processing node or a second processing node, the page returned from the database is the same. For example, the page returned to a first processing node requesting the page of the database may be the same as the page returned to a second processing node requesting the page of the database.

The processing nodes may send requests to perform various modify operations on records of pages of the database. The modify operations may include an insert record operation (to insert a new record in the page), delete record operation (to delete a record of the page), and update record operation (to update a record of the page). The requests may be part of a transaction. Each transaction may comprise one or more requests, where each request is a request to perform a modify operation on a record of a page of the database. Each transaction may be labeled, such as by a transaction number. Each transaction may originate from a single processing node. In other words, for a single transaction, every request to perform a modify operation on a record of a page of the database may originate from the same processing node.

A local log buffer may be maintained at each of the processing nodes. The local log buffer may comprise log records and each log record may include information about a modify operation to be performed on a record of a page of the database (e.g., information about an operation to insert, deleted, or change a record of a page of the database). The log buffer may comprise redo and/or undo information for the operations requested by the processing node. The log records may be compound, in which each log record may include information about multiple changes to records of a same page and/or information about multiple changes to records of different pages. A compound log record may be referred to as a mini transaction (MTR), such as in the InnoDB database storage engine.

The requests to perform various modify operations records of pages of the database may be transmitted by the processing nodes to an intermediate system that is in communication with the database, such as a common log node. The common log node includes a common log, which is a software system that resides, or is implemented, on the common log node. The requests may comprise the log records. In other words, in some embodiments, the processing nodes may transmit log records to the common log node. The common log may receive log records from one or more processing nodes. The common log may check the log records for conflicting operations, or in other words the common log may validate the log records. Having the common log perform this conflict checking may be more efficient than having a separate system, or separate device, perform the conflict checking. The common log may validate the log records to ensure that two processing nodes are not concurrently requesting operations be performed on records of the same page of the database. After validating the log record, the common log may transmit the log record to the database, and/or transmit an instruction to the database based on the log record.

FIG. 1 is a block diagram of a computing device 100 that may be used for implementing methods in accordance with representative embodiments described herein. The computing device 100 may be used to implement a processing node 210 or 220, a common log node 235, and/or storage nodes 240, as described below and in FIG. 2. Specific nodes may utilize all of the components shown or only a subset of the components, and levels of integration may vary from node to node. Furthermore, a node may contain multiple instances of a component, such as multiple processing units, processors, memories, transmitters, receivers, storage devices, etc. The computing device 100 may be any type of suitable computing device, such as a computer or a server within a data center. The computing device 100 may comprise a central processing unit (CPU) 114, a bus 120, and/or memory 108, and may optionally also comprise a mass storage device 104, a video adapter 110, and/or an input/output (I/O) interface 112 (shown in dashed lines). Those skilled in the art will appreciate that the CPU 114 is representative of a processing capability. In some embodiments, in place of a conventional CPU, a specialized processing core may be provided. For example, a Graphic Processing Unit (GPU), Tensor Processing Unit (TPU), and/or other so-called accelerated processors (or processing accelerators) may be provided in addition to or in place of the CPU 114.

The CPU 114 may comprise any type of electronic data processor. The memory 108 may comprise any type of non-transitory system memory such as static random access memory (SRAM), dynamic random access memory (DRAM), synchronous DRAM (SDRAM), read-only memory (ROM), or a combination thereof. For example the memory 108 may comprise ROM for use at boot-up, and DRAM for program and data storage for use while executing programs. The bus 120 may be one or more of any type of several bus architectures including a memory bus or memory controller, a peripheral bus, and/or a video bus.

The mass storage device 104 may comprise any type of non-transitory or non-volatile storage device configured to persistently store data, programs, and other information and to make the data, programs, and other information accessible via the bus 120. The mass storage device 104 may comprise, for example, one or more of a solid state drive, hard disk drive, a magnetic disk drive, and/or an optical disk drive.

The video adapter 110 and the I/O interface 112 may provide interfaces to couple external input and output devices to the computing device 100. Examples of input and output devices comprise a display 118 coupled to the video adapter 110 and an I/O device 116 such as a touch-screen coupled to the I/O interface 112. Other devices may be coupled to the computing device 100, and additional or fewer interfaces may be utilized. For example, a serial interface such as Universal Serial Bus (USB) (not shown) may be used to provide an interface for an external device.

The computing device 100 may also comprise one or more network interfaces 106, which may comprise at least one of wired links, such as an Ethernet cable, and/or wireless links to access one or more networks 122. The network interfaces 106 may allow the computing device 100 to communicate with other computing devices 100 via the networks 122. For example, the network interfaces 106 may provide wireless communication via one or more transmitters/transmit antennas and one or more receivers/receive antennas. The computing device 100 may be in communication with a local-area network or a wide-area network for data processing and communications with remote devices, such as other processing units, the Internet, or remote storage facilities.

Figure 2:
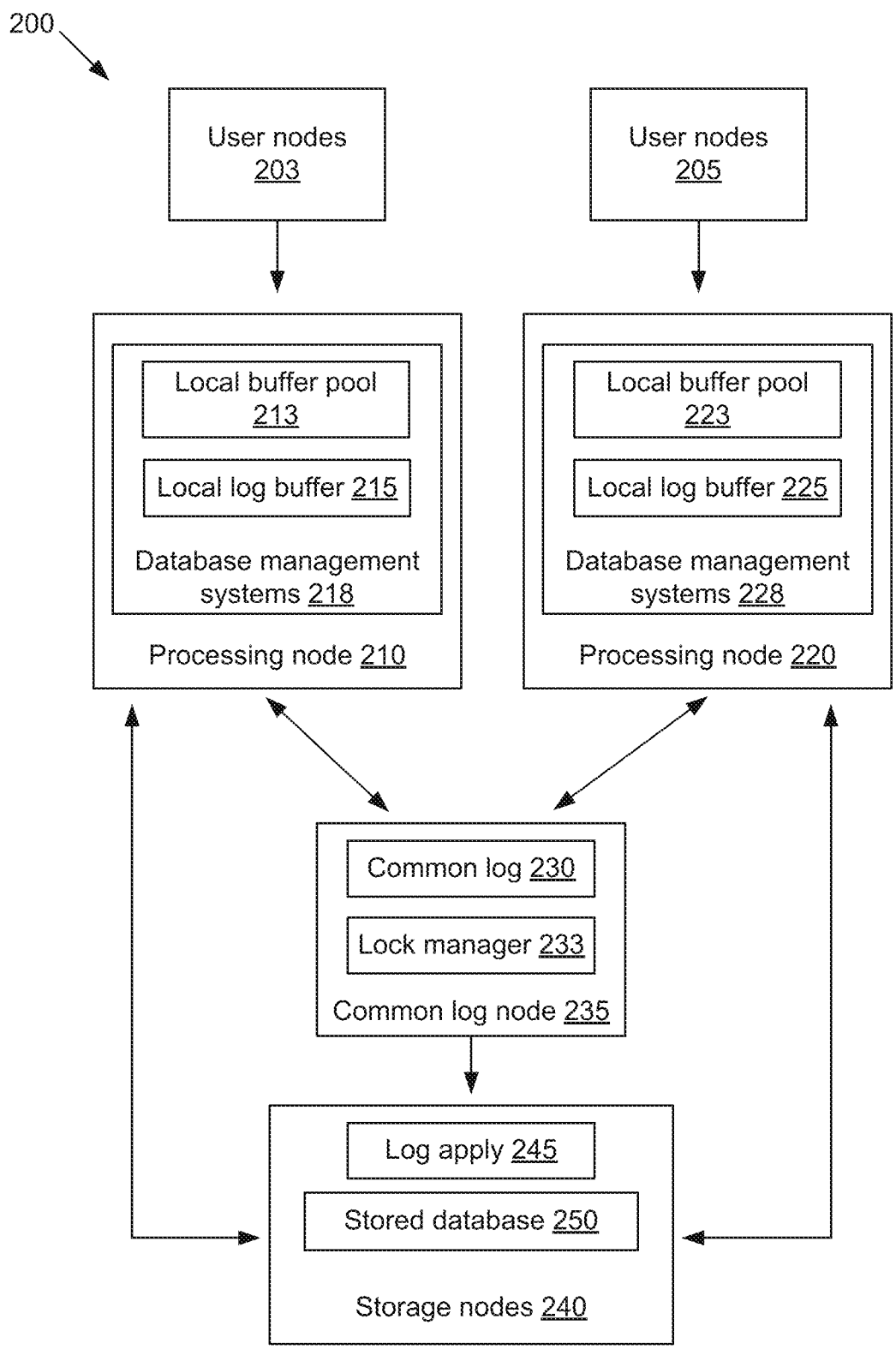
FIG. 2 shows a diagram comprising nodes of a database system according to one or more illustrative aspects of the disclosure.

FIG. 2 shows a diagram comprising nodes of a database system 200 according to one or more illustrative aspects of the disclosure. The database system 200 comprises two processing nodes 210, 220, a common log node 235, and storage nodes 240. Processing nodes 210 and 220 may be processing nodes having read-only access, write-only access, or read/write access to a stored database 250 of the storage nodes 240. The processing nodes 210 and 220 may comprise SQL nodes, or any other type of processing node for accessing the stored database 250. The processing nodes 210 and 220 may be located in a same location, in different locations, and/or a combination thereof. For example, the processing nodes 210 and 220 may be located in a same data center. In another example, the processing nodes 210 and 220 may be located in different data centers that are hundreds of kilometers apart from each other. The data centers may be connected together using a high speed, high bandwidth data connection. The data centers may form part of a large scale network that provides database system services to customers. Each processing node 210 and 220 may comprise one or more computing devices 100. Although FIG. 2 illustrates a database system 200 that includes two example processing nodes, 210 and 220, in alternative aspects the database system 200 may include any number of processing nodes.

The processing nodes 210 and 220 may receive requests to perform operations on records of the database from user nodes 203 and 205, respectively. The user nodes 203 and 205 may comprise user interfaces used by users and/or software to generate requests to perform operations records of the database. The user nodes 203 and 205 may transmit, to the processing nodes 210 and 220, requests to perform a read record operation to read a record of a page of the stored database 250. The user nodes 203 and 205 may also transmit, to the processing nodes 210 and 220, requests to perform modify operations on pages of the stored database 250. Although FIG. 2 illustrates two user nodes 203, 205 transmitting operations to processing nodes 210, 220, respectively, in alternative aspects, the user nodes 203, 205 may transmit request to both processing nodes 210, 220. Also, in alternative aspects, the database system may include any number of user nodes and each user node may send requests to a single processing node, or multiple processing nodes.

The processing nodes 210 and 220 may comprise any type of database management system (i.e., RDBMS) 218 and 228. For example the processing nodes 210 and 220 may comprise an Oracle database management system, MySQL database management system, Microsoft SQL Server management system, PostgreSQL database management system, IBM DB2 database management system, Microsoft Access database management system, SQLite database management system, or any other type of database management system. The type of database management system 218 and 228 operated by the processing nodes 210 and 220 may correspond to the type of stored database 250 in use. For example if the stored database 250 is a MySQL database, the database management systems 218 and 228 may comprise MySQL RDBMS systems.

The database management systems 218 and 228 may update the stored database 250. The database management systems 218 and 228 may create log records that are temporarily stored in the local log buffer 215 or 225 before being sent to the common log node 235. The common log node 235 may validate operations included in the log records and forward the log records to the storage nodes 240. Each log record may comprise information about an operation to be performed on a record of a page of the stored database 250. The log apply 245 of the storage nodes 240 may apply the operations included in the log records to the stored database 250.

The processing nodes 210 and 220 may store a portion of the pages stored in the stored database 250 in their respective local buffer pools 213 and 223. The local buffer pools 213 and 223 may be part of the database management systems 218 and 228, respectively. The local buffer pools 213 and 223 may comprise pages that were previously accessed by the processing nodes 210 and 220. For example if the processing node 210 previously requested a latest validated version of a page, the latest validated version of the page may be stored in the local buffer pool 213. Prior to requesting an operation on a record of a page, the database management system 218, 228 of the processing node 210, 220 may determine whether it has the latest validated version of the page. If the database management system 218, 228 of the processing node 210, 220 does not have the page, or if the version of the page that the processing node 210 or 220 has is not the latest validated version of the page, the database management system 218, 228 processing node 210, 220 may request the latest validated version of the page from the storage nodes 240. In response to the request, the storage nodes 240 may retrieve the latest validated version of the page from the stored database 250 and transmit the latest validated version of the page to the database management system 218, 228 of the processing node 210, 220 that requested the page.

The storage nodes 240 comprise the stored database 250 that stores data in any suitable format. The stored database 250 stores data in a plurality of pages, where each page stores a portion of the data in the stored database 250. Each page may be assigned a page number, where the page number may be used to identify the page. As the page is modified, each version of the page may be assigned a version number. The version number of a page may be incremented each time a modify operation is performed on a record of the page. As modify operations are performed on a record of a page, the version number of the page may increase linearly, i.e., the version number may increase but does not decrease. Modify operations may be performed by log apply 245, which may execute one or more requests to perform modify operations records of pages in the stored database 250. The storage nodes 240 may receive log records from the common log node 235, and the log apply 245 may execute the modify operations based on the information included in the log records, thereby applying them to the stored database 250.

The stored database 250 may comprise any type of database. For example, the stored database 250 may comprise an Oracle database, MySQL database, Microsoft SQL Server, PostgreSQL database, IBM DB2 database, Microsoft Access database, SQLite database, or any other type of database. The storage nodes 240 may be distributed across or over, and/or be implemented using one or more computing devices 100. The computing devices 100 may be located in different locations. For example, a first group of computing devices 100 implementing the storage nodes 240 may be in a first data center, and a second group of computing devices 100 implementing the storage nodes 240 may be in a second data center. The stored database 250 may be implemented in any suitable storage device, such as data in memory or on disk, data stored on a single storage node 240, and/or data distributed across several storage nodes 240.

The database management systems 218, 228 of the processing nodes 210 and 220 may transmit requests for pages to the database storage component 240. The requests may comprise one or more page numbers. In response to the requests, the storage nodes 240 may transmit pages corresponding to the requested page numbers to the database management systems 218, 228 of the processing nodes 210 and 220. The database management systems 218, 228 of the processing nodes 210 and 220 may receive pages that have not yet been committed to the stored database 250. For example the database management systems 218, 228 of the processing nodes 210 and 220 may receive the latest validated version of a page, which might not have been committed to the stored database 250 yet. The processing nodes 210 and 220 are not be permitted to write over data in a page that has not yet been committed to the stored database 250.

As described above, the database management systems 218, 228 of each processing node 210 and 220 may maintain a local log buffer 215 and 225, respectively. The local log buffers 215 and 225 may describe one or more operations to perform on records of pages of the stored database 250. For example the local log buffer 215 may store log records comprising information about operations requested by the database management systems 218 of the processing node 210. Each log record in the local log buffers 215 and 225 may comprise a page number, a base page version number, a next page version number, information about an operation to perform on a record of the page, an old value, a new value, and/or any combination thereof.

The page number in the log record may indicate the page in the stored database 250 to perform the operation on. Each page may be associated with a current version number, which may be used to track the version of the page and/or the last processing node that modified the page. The base page version in the log record may comprise a version of the page that includes the record the operation was based on. When one of the database management systems 218, 228 processing nodes 210 or 220 generated the operation, the base page version was the latest validated version of the page that the respective processing node 210 or 220 was aware of. The next page version may comprise the version number that the page will have after performing the operation. The operation may comprise instructions for any changes to be made to a record of the page. The new value may comprise a new value for all or a portion of the data of the page. The old value may comprise a current value of all or a portion of the data stored on the page.

The database management systems 218, 228 of each of the processing nodes 210 and 220 may implement concurrency control mechanisms to prevent local conflicts from occurring. The concurrency control mechanisms at the processing nodes 210 and 220 may resolve conflicts that occur within the individual processing node 210 or 220. In other words, the concurrency control mechanisms may resolve conflicts that occur between operations of the processing node 210, but typically might not be able to resolve conflicts that occur between operations of the processing node 210 and the processing node 220. The common log 230 may resolve conflicts that occur between operations of the processing node 210 and the processing node 220, commonly referred to as global conflicts.

Requests to perform modify operations, transmitted from the processing nodes 210 and 220 to the common log node 235 may be applied, by the log apply 245, to the stored database 250. The processing nodes 210 and 220 may transmit log records of their local log buffers 215 and 225 to the common log node 235. One of the processing nodes 210 or 220 may transmit all the log records in their respective local log buffer 215 or 225, a portion of the log records in their respective log buffer 215 or 225, instructions generated based on the log records in their respective local log buffer 215 or 225, or any other data based on the log records in their respective local log buffer 215 or 225. The common log node 235 may, based on the local log buffer 215 or 225 or other data received from the processing nodes 210 and 220, cause the log apply 245 of the storage nodes 240 to update the stored database 250. The common log node 235 may transmit log records comprising information about modify operations to performed on records of pages of the database to the storage nodes 240, and the log apply 245 may apply the operations to the stored database 250. The common log node 235 may transmit a log record to the storage nodes 240, such as a log record of a local log buffer 215 or 225 received from a processing node 210 or 220. All operations for a transaction may be applied to the stored database 250 prior to the transaction being committed. However, a transaction is not considered as completed until the transaction has actually been committed.

The database management systems 218 of the processing nodes 210 and the database management systems 228 of the processing node 220 may each maintain local buffer pools 213 and 223, which may comprise pages retrieved from the stored database 250. The local buffer pools 213 and 223 may comprise one or more different pages, where each page has a different page number. The local buffer pools 213 and 223 may comprise one or more versions of a page, where each version of the page has a different version number.

Figure 3:
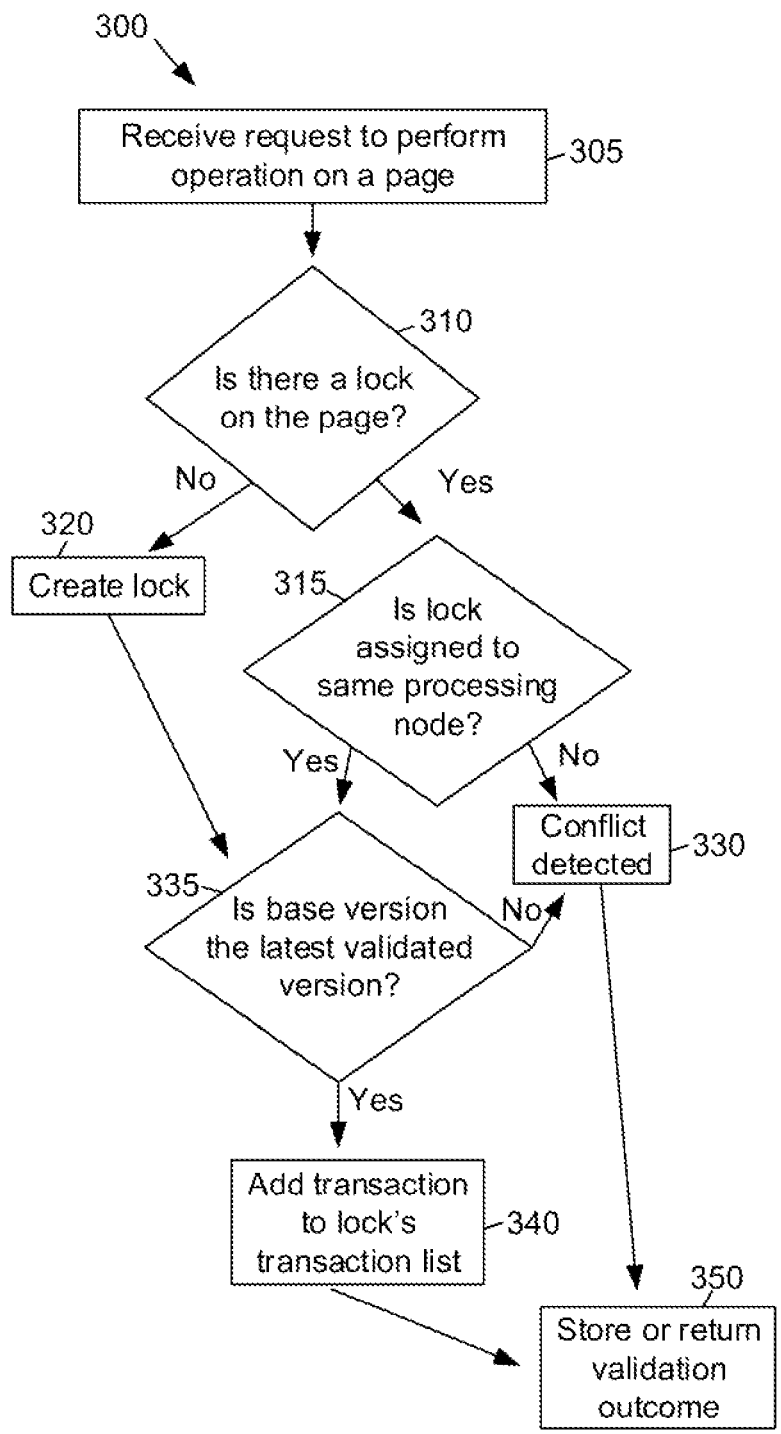
FIG. 3 is a flow diagram of a method for detecting conflicts according to one or more illustrative aspects of the disclosure.

The common log 230 of the common log node 235 may detect instances in which conflicts occur between transactions on different processing nodes 210 and 220. For example, if the processing node 210 and the processing node 220 both send a request to perform a modify operation on records of a same version of a same page, the common log 230 may determine whether a conflict has occurred. Each transaction may run on a single processing node 210 or 220, and modify operations might not cross between processing nodes 210 and 220. In other words, either every modify operation of a single transaction may be requested by the processing node 210, or every modify operation of the single transaction may be requested by the processing node 220. The method 300, described below and in FIG. 3, is an example of a method that may be used by the common log 230 to resolve conflicts.

The common log 230 may determine whether or not modify operations cause a conflict or not. The common log node 235 may prevent two transactions on different processing nodes 210 and 220 from updating a same page concurrently. The common log node 235 may transmit, to the requesting processing node 210 or 220 that sent the request to perform the modify operation, an indication of whether or not the modify operation caused a conflict, i.e., an indication of whether the modify operation passed or failed validation.

The processing node 210 or 220 may transmit a request, to the common log node 235, to commit a transaction. The request to commit a transaction may be transmitted after receiving, by a processing node 210 or 220 and from the common log node 235, an indication that each operation of a transaction has been validated. The common log 230 may then determine whether to commit the transaction to the stored database 250. If one or more operations in the transaction failed validation, the common log 230 may abort the transaction. The common log node 235 may transmit an indication to the requesting database management systems 218, 228 of the processing node 210 or 220 that the transaction is being aborted.

After determining to abort a transaction, or receiving an indication from the common log node 235 that a transaction is being aborted, the processing node 210 or 220 that transmitted a request to commit a transaction may reverse the transaction locally. To reverse the transaction locally, the processing node 210 or 220 that transmitted a request to commit a transaction may reverse any effects of the requests in the transaction on pages stored in their respective local buffer pool 213 or 223. The common log node 235 may transmit an indication to the storage nodes 240 that the transaction is being reversed. The storage nodes 240 may reverse any effects of the modify operations included in the transaction on pages stored in the stored database 250.

When the common log node 235 receives a request to commit a transaction and determines that each operation included in the transaction has been validated, the common log node 235 may transmit a request to the storage nodes 240 to commit the transaction. The storage nodes 240 may apply the transaction to the stored database 250. The common log node 235 may transmit an indication to the processing nodes 210 and 220 that the transaction has been committed. After a transaction is committed to the stored database 250, it may be difficult and/or impossible to reverse the operations performed included in the transaction.

The common log node 235 may maintain and grant one or more locks. The processing nodes 210 and 220 may maintain a local copy of all or a portion of the locks assigned by the lock manager 233. The processing nodes 210 and 220 might not maintain a local copy of the locks, and may instead access the locks via the common log node 235. The locks may be data structures stored in memory. The locks may be managed by a lock manager 233 executing on the common log node 235. The locks may be used to prevent conflicts from occurring. A lock indicates that access to a specific page is restricted to one of the processing nodes 210 or 220. The lock provides exclusive access to a single processing node 210 or 220 for performing operations on records of a page.

A processing node 210 or 220 that does not hold the lock may still be able to read the page, but is unable to perform modify operations on records of the page. The lock may comprise a page number (or other identifier of a page), an identification of the processing node holding the lock, and a transaction list of one or more transactions. The transaction list may indicate all in-flight transactions, on the processing node holding the lock, that seek to perform modify operations on records of the page. An in-flight transaction is a transaction with pending modify operations on records of the page, where the transaction has not yet been committed.

After a transaction is committed, the common log 230 may remove the committed transaction from the transaction list included in the lock. If the transaction list included in the lock is empty, the common log 230 may cause the lock manager 233 to release (delete) the lock. After the lock is released (deleted), any other processing node 210 or 220 may perform operations on records of the page. When a transaction is aborted, the common log 230 may delete the transaction from the transaction list of each lock that includes the aborted transaction. The common log 230 may release any locks with empty transaction lists after removing the aborted transaction.

The common log 230 may monitor log records received from the processing nodes 210 and 220. When a log record is received, for example from the processing node 210, that indicates that a transaction T has updated a page P, the common log 230 may determine whether there is a lock corresponding to the page P. If the common log 230 determines that there is not a lock corresponding to the page P, the common log 230 may grant a lock corresponding to the page P to the processing node 210, and may add the transaction T to the lock's transaction list if it is not already there. On the other hand, if the lock corresponding to the page P is held by another processing node, such as the processing node 220, there may be a conflict and the transaction T may be aborted and/or reversed.

The common log node 235 may transmit, to the processing nodes 210 and 220, a record of which transactions have been committed and/or aborted. The record may be transmitted at pre-determined intervals, after a pre-determined amount of transactions have been committed and/or aborted, in real time as transactions are committed and/or aborted, or at any other interval. For each of the processing nodes 210 and 220, the transmitted record may indicate the transactions that have been committed and/or aborted by other processing nodes.

FIG. 3 is a flow diagram of a method 300 for detecting conflicts according to one or more illustrative aspects of the disclosure. In one or more embodiments, the method 300 or one or more steps thereof may be performed by the common log 230 of the common log node 235. The method 300 or one or more steps thereof may be embodied in computer-executable instructions that are stored in a non-transitory computer-readable medium, such as a non-transitory mass storage device 104, and loaded into memory 108 and executed by CPU 114 of the computing device 100 implementing the common log node 235. Some steps or portions of steps in the flow diagram may be omitted or changed in order.

At step 305 a request is received to perform a modify operation on record of a page (the "request"). The request may be received from a processing node, such as one of the processing nodes 210 or 220. The processing node that transmitted the request may be referred to as the requesting processing node. The request may comprise a page number of a page to perform the modify operation on, a transaction corresponding to the request, a base version number of the page, an updated version number of the page, a requesting processing node corresponding to the transaction, a modify operation to be performed on a record of the page, and/or any other information for performing a modify operation on a record of a page. The modify operation may comprise any an operation to modify a record of a page, such as an insert record operation to insert a new record in the page, delete record operation to delete a record of the page, and update record operation to update a record of the page.

The request may be received individually or with one or more other requests. For example, the processing nodes 210 and 220 may transmit multiple requests, where each request is a request to perform a modify operation on a record of a page. In some embodiments, each request transmitted by a processing node 210, 220 may comprise a log record from the local log buffer 215, 225 that includes information about the modify operation to be performed on a record of a page.

At step 310 a determination may be made as to whether there is an active lock corresponding to the page (e.g., a lock has been assigned to the page that corresponds to the page included in the request). The locks may be stored in a hash table, search tree, or any other data structure. The locks may be searched to determine whether there is a lock corresponding to the page number indicated in the request received at step 305. A collection of locks may be queried to determine whether there is an active lock corresponding to the page.

If it is determined at step 310 that there is not an active lock corresponding to the page, a lock may be created at step 320. The lock that is created may include the page, the requesting processing node, and the transaction included in the request. For example the created lock may include the page number, the transaction number, and a name or other identifier of the requesting processing node included in the request. After creating the lock, a base page version number included in the request may be compared to the latest page version number at step 335, described below.

If it is determined at step 310 that there is an active lock corresponding to the page requested modify operation, a determination may be made at step 315 as to whether the active lock is assigned to the requesting processing node. The active lock corresponding to the page is retrieved and the processing node that is assigned the active lock is determined. The processing node that has been assigned the active lock corresponding to the page may be compared to the requesting processing node. If the requesting processing node is not the processing node that has been assigned to the active lock corresponding to the page, a conflict may occur and a conflict may be detected at step 330. At step 330, a conflict is detected and method 300 proceeds to step 350 where an indication that the request has failed validation is transmitted to the requesting processing node and/or stored. The indication may comprise the page number, transaction number, requested operation, and/or any other details corresponding to the requested operation.

If the active lock is determined at step 315 to have been assigned to the requesting processing node, or after the lock has been created at step 320, at step 335, a determination is made whether the base version number of the page indicated in the request is the latest validated version of the page by comparing the base version number of the page indicated in the request to a latest validated version number of the page.

The common log 230 may maintain a record of the latest validated version number of pages of the stored database 250. The latest validated version number of the page may comprise the version number corresponding to the latest version of the page that has passed validation and/or been written to the common log 230. The latest validated version of the page may have been committed to the stored database 250 or might not have been committed to the stored database 250.

If the base version number of the page is not the same as the latest validated version number of the page, a conflict may be detected at step 330. When a conflict is detected, method 300 proceeds to step 350 and an indication that the modify operation included in the request has failed validation is transmitted to the requesting processing node and/or stored.

If the base version is determined to be the latest validated version at step 335, at step 340 the transaction number of the modify operation included in the request may be added to the lock's transaction list. The transaction list may comprise an ordered list, and the transaction number of the modify operation included in the request may be added at the end of, i.e. appended to, the ordered list. After the transaction has been added to the transaction list, at step 350 an indicator the modify operation included in the request has passed validation may be stored and/or transmitted. If a conflict was detected at step 330, the modify operation included in the request may be deemed to have failed validation. Otherwise, if no conflict was detected and the transaction was added to the lock's transaction list at step 340, the modify operation included in the request may be deemed to have been validated.

A boolean array may be used to store and/or transmit the indication that the modify operation included in the request has passed or has failed validation. The boolean array may correspond to a plurality of requests, each request to perform a modify operation on record of a page. Each index of the boolean array may be associated with a request and may comprise an indication as to whether a modify operation included in that request passed validation or failed validation. After a pre-determined number of modify operations have passed or failed validation, the boolean array may be transmitted to the requesting processing node. The boolean array may correspond to a received log buffer, and each index of the boolean array may correspond to one log record of the log buffer. If the modify operation passed validation, an indicator that the modify operation was validated may be written to the boolean array at step 345. If the modify operation failed validation, an indicator that the modify operation failed validation may be written to the boolean array at step 330.

After each log record in the log buffer has passed or failed validation, the boolean array, or any other indicator that one or more modify operations have passed or failed validation, may be transmitted to the requesting processing node at step 350. The boolean array may indicate, for each log record in the received log buffer, whether that modify operation passed or failed validation. If any of the modify operations failed validation, the transaction which includes that modify operation may be aborted. The transaction may be aborted by the common log 230.

Figure 4:
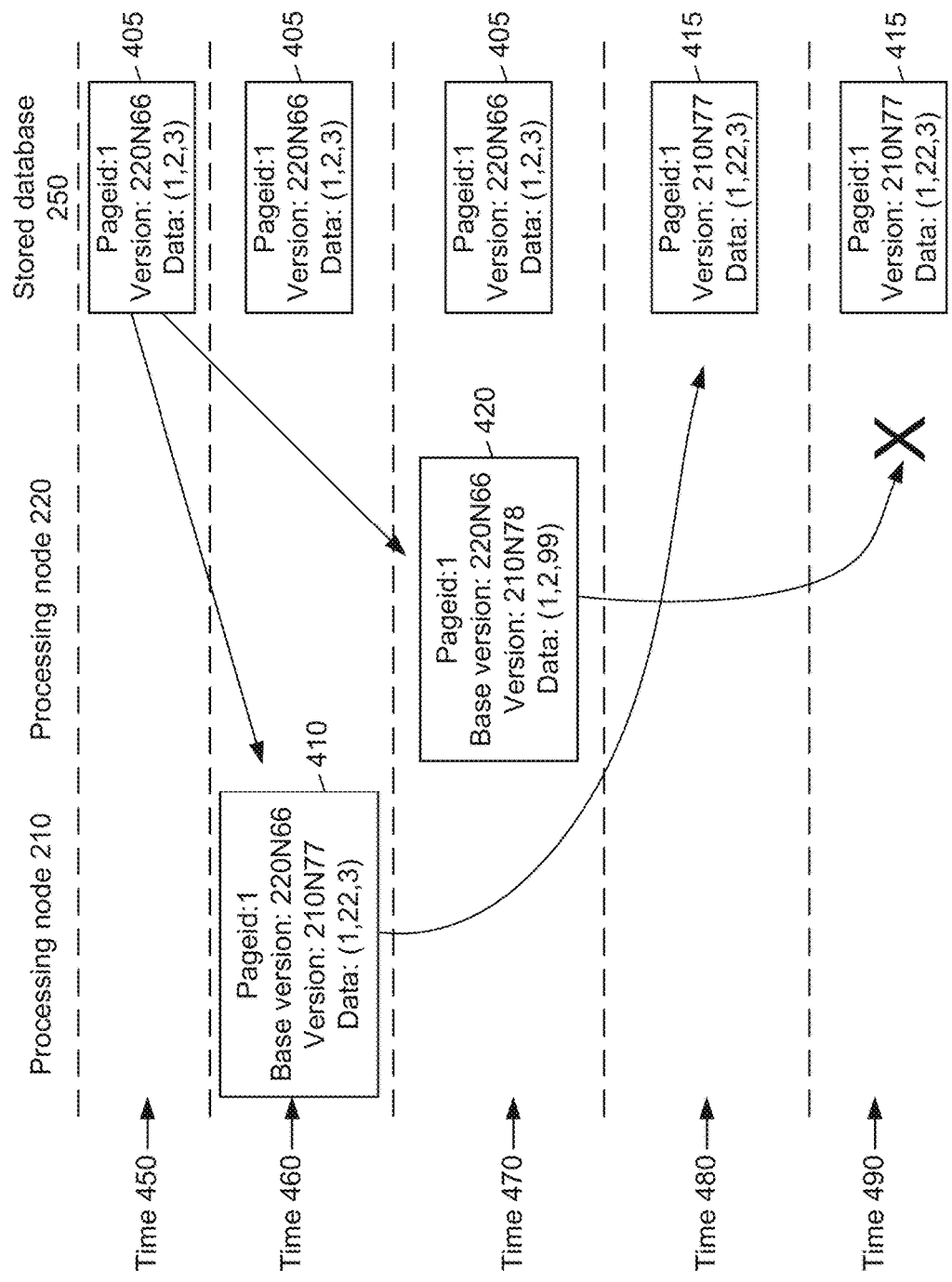
FIG. 4 shows a call flow diagram of page updates according to one or more illustrative aspects of the disclosure.

FIG. 4 shows a call flow diagram of page updates according to one or more illustrative aspects of the disclosure. The processing nodes 210 and 220 may communicate with storage nodes 240 to store and access data in the stored database 250. Although not illustrated in FIG. 4, the processing nodes 210 and 220 may communicate with the storage nodes 240 via the common log node 235. FIG. 4 is an example of modify operations being validated via steps of the method 300.

At time 450, the stored database 250 may comprise a stored page 405. In the example shown in FIG. 4, the stored page 405 has a page number of '1,' a version number of '220N66,' and comprises an array of data holding the values '1,2,3.' The version number of the page may indicate that processing node 220 was the previous processing node to update the page, and that the version of the page is '66.' Although illustrated in an exemplary format, the version number, page number, and/or data may be arranged in any usable format.

At time 460, the processing node 210 may transmit a request to perform a modify operation 410 (the "request 410) on a record of the stored page 405 to update the data stored in page 405. The request 410 comprises a modify operation to update the page 405 to the version number '210N77' from the base version number '220N66,' and to update the data of a record stored in the page to '1,22,3.' The request 410 may be transmitted by the processing node 210, via the common log node 235, to the storage nodes 240.

Prior to the modify operation included in the request 410 being committed to the stored database 250, processing node 220 transmits a request to perform a modify operation 420 ("the request 420") on a record of the stored database 250 comprising an update to a record of the stored page 405. The base version number included in the request 420 may be '220N66,' which may be the current version number of the stored page 405 stored in the stored database 250 and/or the local buffer pool 223 of the processing node 220, and which may be the most recent version number of the page 405 that the processing node 220 is aware of.

At time 480, a record of the stored page 405 may be updated by the modify operation included in the request 410, resulting in page 415. Page 415 comprises the version number and data included in the request 410. The transaction that includes request 410 may be committed to the stored database 250. The page number, '1,' of the stored page 405 may remain the same in the page 415.

At time 490, the common log 230 may determine that the modify operation included in the request 420 causes a conflict. The common log 230 may compare the base version number included in the request 420 to the latest validated version number of the page 415, such as at step 335 of FIG. 3, described above. Because the base version number included in the request 420 is different from the latest validated version number of the page 415, a conflict is detected, the common log sends an indication that the modify operation failed validation at the and the modify operation included in the request 420 on the record is not performed (e.g., the update to the record is not written to the stored database 250).

Figure 5:
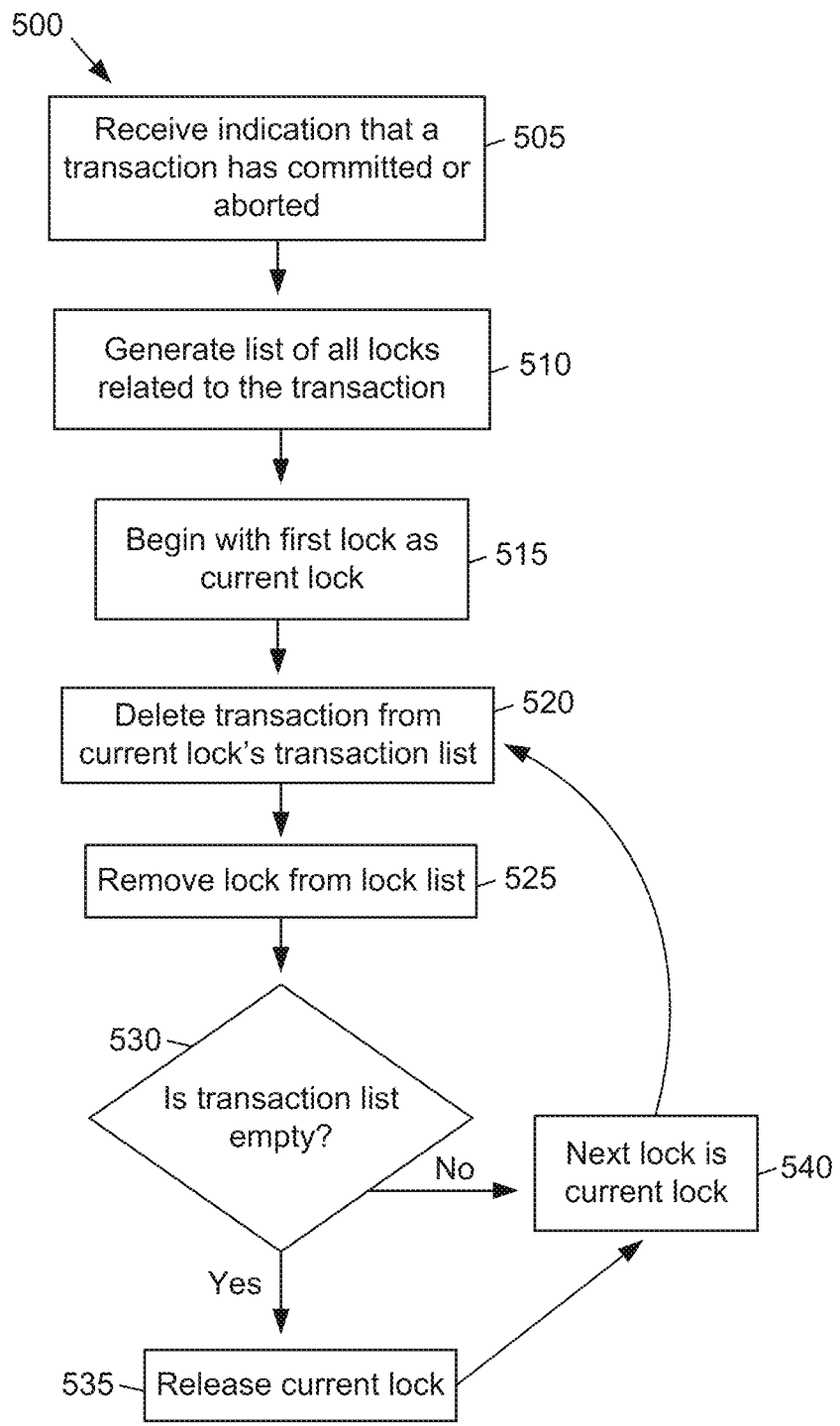
FIG. 5 is a flow diagram of a method for releasing locks according to one or more illustrative aspects of the disclosure.

FIG. 5 is a flow diagram of a method 500 for releasing locks according to one or more illustrative aspects of the disclosure. In one or more aspects, the method 500 or one or more steps thereof may be performed by the common log 230 and/or the lock manager 233 of the common log node 235. The method 500 or one or more steps thereof may be embodied in computer-executable instructions that are stored in a computer-readable medium, such as mass storage device 104, loaded into memory 108 and executed by CPU 114 of the computing device 100 implementing the common log node 235. Some steps or portions of steps in the flow diagram may be omitted or changed in order.

At step 505 an indication is received, such as by the common log node 235, that a transaction has been committed or aborted. The indication may be received from a processing node, such as the processing node 210 or 220. The indication may comprise a transaction number, or any other indication of the transaction.

At step 510 all locks corresponding to the committed or aborted transaction may be determined. All locks maintained by the lock manager 233 may be analyzed, and each lock having the transaction in their transaction list may be found. A list of locks may be generated, where the list comprises each of the locks having the transaction in their transaction list.

At step 515 the lock list may be traversed iteratively, beginning with a first lock in the list of locks as the current lock. The list of locks may be traversed in any order. Any lock in the list of locks may be chosen as the current lock, regardless of position in the list of locks.

At step 520 the transaction may be deleted from the current lock's transaction list. At step 525 the current lock may be removed from the list of locks. Removing the lock from the list of locks may indicate that the transaction is no longer in the lock's transaction list.

At step 530 the transaction list of the current lock may be analyzed to determine whether the list is empty. If the transaction list is determined to be empty, at step 535 the current lock may be released. If the transaction list comprises other transactions, the lock might not be released. After the lock has been released at step 535, or after the transaction list has been determined to comprise at least one other transaction at step 530, at step 540 a next lock in the lock list may be set as the current lock. If there are no available locks to select as the current lock, or in other words if no locks remain in the lock list at step 540, then the method 500 may end. After the current lock is set as the current lock at step 540, the transaction may then be deleted from the new current lock's list of locks at step 520.

Figure 6:
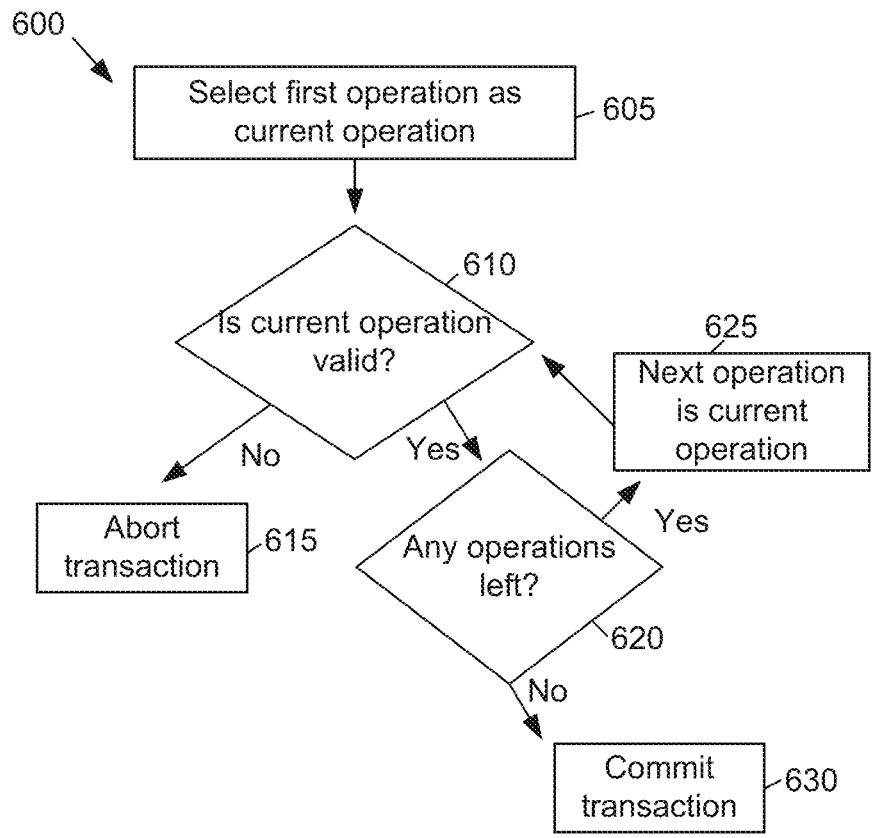
FIG. 6 is a flow diagram of a method for committing transactions according to one or more illustrative aspects of the disclosure.

FIG. 6 is a flow diagram of a method 600 for committing transactions according to one or more illustrative aspects of the disclosure. In one or more aspects, the method 600 or one or more steps thereof may be performed by one of the database management systems 218, 228 of the processing nodes 210 or 220, or the common log 230 of the common log node 235. The method 600 or one or more steps thereof may be embodied in computer-executable instructions that are stored in a computer-readable medium, such as a non-transitory mass storage device 104, loaded into memory 108 and executed by CPU 114 of the computing device 100 implementing the processing nodes 210 or 220, or the common log node 235. Some steps or portions of steps in the flow diagram may be omitted or changed in order.

The method 600 may be used to determine whether to commit a transaction or reverse a transaction. If a transaction comprises a modify operation that failed validation, the transaction may be aborted and/or the changes on every page modified by the transaction may be reversed. The pages that modify operations of a transaction have modified may be determined from locks, such as the locks maintained by the lock manager 233 of the common log node 235 and/or the database management systems 218 of the processing node 210 or the database management system 228 of processing node 220. All locks maintained by the lock manager 233 of the common log node 235 or one of the processing nodes 210 and 220 may be searched to determine a list of all locks that comprise the transaction in their transaction list. The locks may be searched by the lock manager 233 of the common log node 235 and/or one of the processing nodes 210 and 220. The page numbers of the locks in the list may be determined and/or stored in a list. One of the processing nodes 210 or 220 may transmit an instruction to the common log node 235 to return a list of all page numbers that a transaction has modified. The list of page numbers may indicate every page that was modified by a modify operation of the transaction.

A processing node, such as the processing nodes 210 and 220, may receive one or more records indicating whether modify operations passed or failed validation. The one or more records may be stored in an array, such as a boolean array, or any other suitable data structure. The method 600 may iteratively traverse the array, processing each operation in the array.

At step 605 a first modify operation may be selected from the array as the current modify operation. Any modify operation may be selected from the array, or, in other words, the modify operations in the array may be traversed in any order.

At step 610 the current modify operation may be determined to have passed or failed validation. The array may indicate whether the current modify operation passed or failed validation. For example, if the array is a boolean array, a '1' in the entry corresponding to the modify operation may indicate that the modify operation passed validation and a '0' may indicate that the modify operation failed validation.

If the modify operation is determined to have passed validation at step 610, at step 620 a determination may be made as to whether there are any modify operations corresponding to the transaction that are left to be examined at step 610. The array may comprise indications for all modify operations included in the transaction, in which case a determination may be made at step 620 as to whether the array has been fully traversed.

If no operations remain at step 620, because all modify operations included in the transaction have been examined at step 610 and determined to be valid, the transaction may be committed at step 630. An indication that the transaction should be committed may be transmitted. The indication may comprise a transaction number of the transaction and an instruction to commit the transaction. The processing node 210 or 220 performing the transaction may transmit the indication to the common log node 235. The common log node 235, and/or the processing node 210 or 220, may transmit an instruction to the storage nodes 240 to commit the transaction. The common log node 235 may transmit an indication to all processing nodes, or all processing nodes other than the processing node corresponding to the transaction, that the transaction has been committed.

If operations remain at step 620, the next modify operation in the array may be selected from the array as the current operation at step 625. The current modify operation may then be examined at step 610 to determine whether the modify operation passed or failed validation.

If, at step 610, any modify operation of the current transaction was determined to be invalid, the transaction may be aborted at step 615. Method 700, described below and in FIG. 7, is a method for aborting a transaction.

Figure 7:
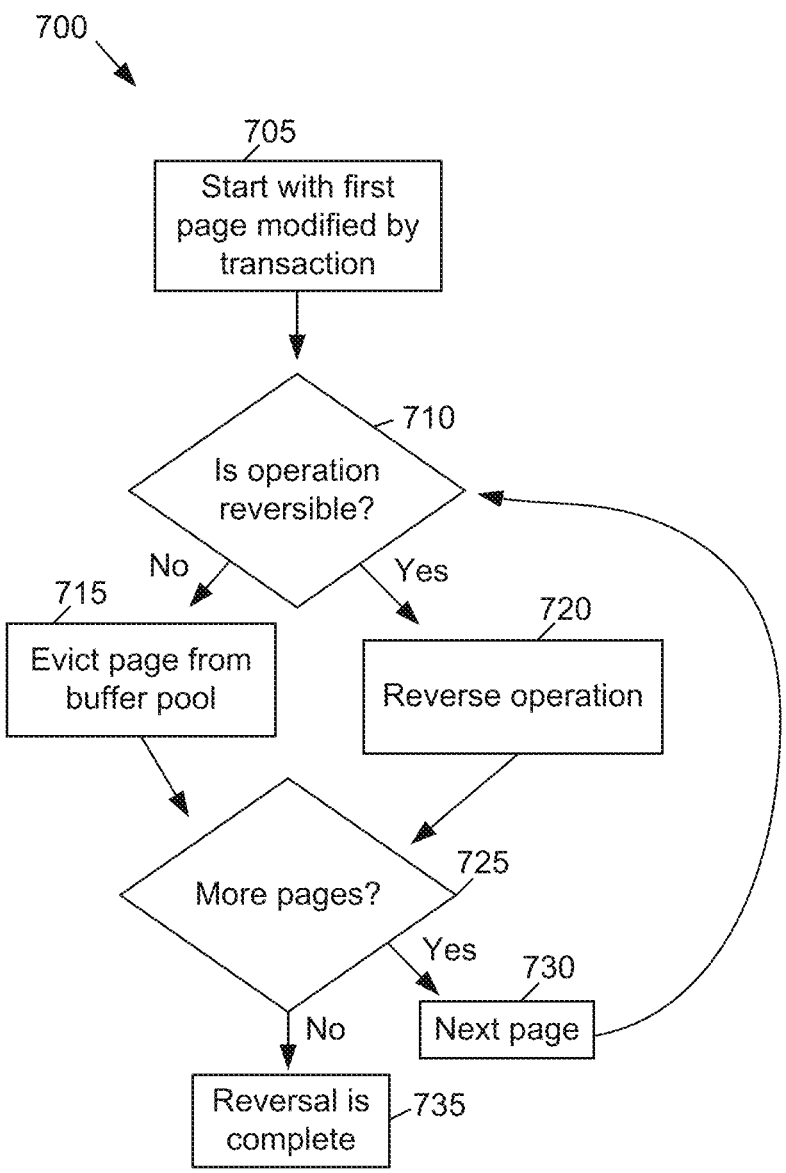
FIG. 7 is a flow diagram of a method for aborting transactions according to one or more illustrative aspects of the disclosure.

FIG. 7 is a flow diagram of a method 700 for aborting transactions according to one or more illustrative aspects of the disclosure. In one or more aspects, the method 700 or one or more steps thereof may be performed by one or more computing devices or entities. For example, portions of the method 700 may be performed by nodes of the computing device 100. All or portions of the method 700 may be performed by the processing nodes 210 and 220, the common log node 235, and/or the storage nodes 240. The method 700 or one or more steps thereof may be embodied in computer-executable instructions that are stored in a computer-readable medium, such as a non-transitory computer-readable medium. Some steps or portions of steps in the flow diagram may be omitted or changed in order.

At step 705 the process of aborting the transaction begins with a first page modified by a modify operation included in the transaction. Any page, of the pages modified by modify operations included in the transaction, may be selected at step 705.

At step 710 a determination is made as to whether the modify operation is reversible. Some modify operations may be reversed, whereas other modify operations may be irreversible. Which modify operations may be reversible and which modify operations may be irreversible may depend on the type of RDBMS used. A pre-determined list may indicate which types of modify operations are reversible and which types of modify operations are irreversible.

If the modify operation is reversible, at step 720 the modify operation is reversed. The modify operation may be reversed using transaction roll-back mechanisms of the RDBMS. Changes to the page made by the modify operation may be undone using stored information. For example, roll-back segments may store undo information for reversing the modify operations. A reversible modify operation may be reversed without affecting any other transactions.

If the modify operation is irreversible, the page may be removed from a local buffer pool 213, 223 of the requesting processing node 210, 220 at step 715. The removed page may be replaced with a latest validated version of the page, which may be retrieved from the storage nodes 240.

After the page is removed from the buffer pool at step 715, or the modify operation is reversed at step 720, a determination may be made at step 725 as to whether there are more pages, corresponding to the transaction, to process. If there are further pages, a next page corresponding to the transaction may be selected from the pages modified by modify operations of the transaction. Any page modified by a modify operation included in the transaction that has not already been processed at either steps 715 or 720, may be selected as the next page. After selecting the next page at step 730, the modify operation corresponding to that page may be examined at step 710 to determine whether the modify operation is reversible.

If it is determined at step 725 that all pages have been processed at either steps 715 or 720, then the reversal is complete at step 735. At step 735 the locks corresponding to the transaction may be released. An indication may be transmitted to the common log node 235 that the transaction has been aborted. The indication may comprise a transaction number of the transaction. Transmitting the indication to the common log node 235 may cause the common log 230 to delete the transaction from the transaction list of all locks corresponding to the reversed transaction, and release any of the locks that have no other transactions in their transaction list.

Figure 8A:
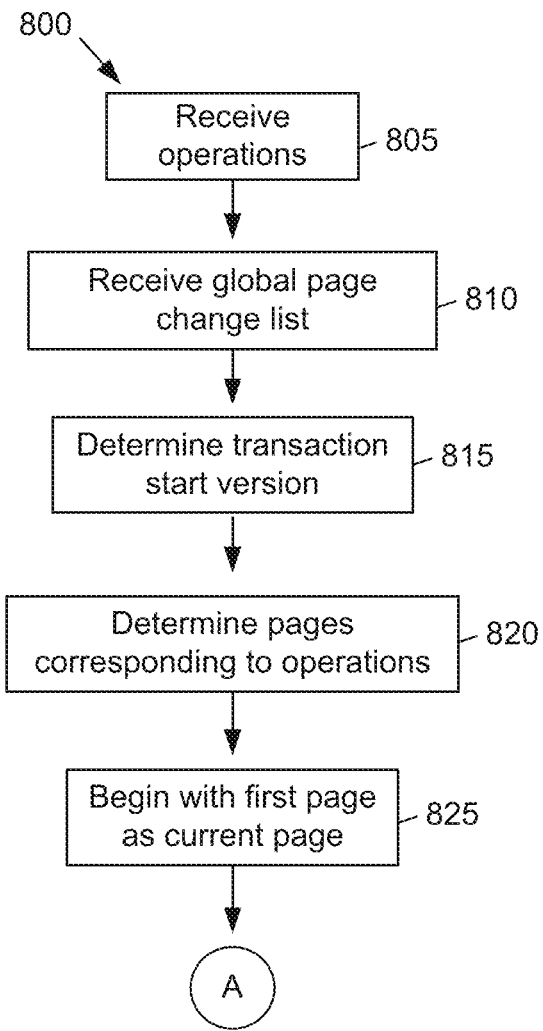
FIGS. 8A and 8B are a flow diagram of a method for processing operations according to one or more illustrative aspects of the disclosure.
Figure 8B:
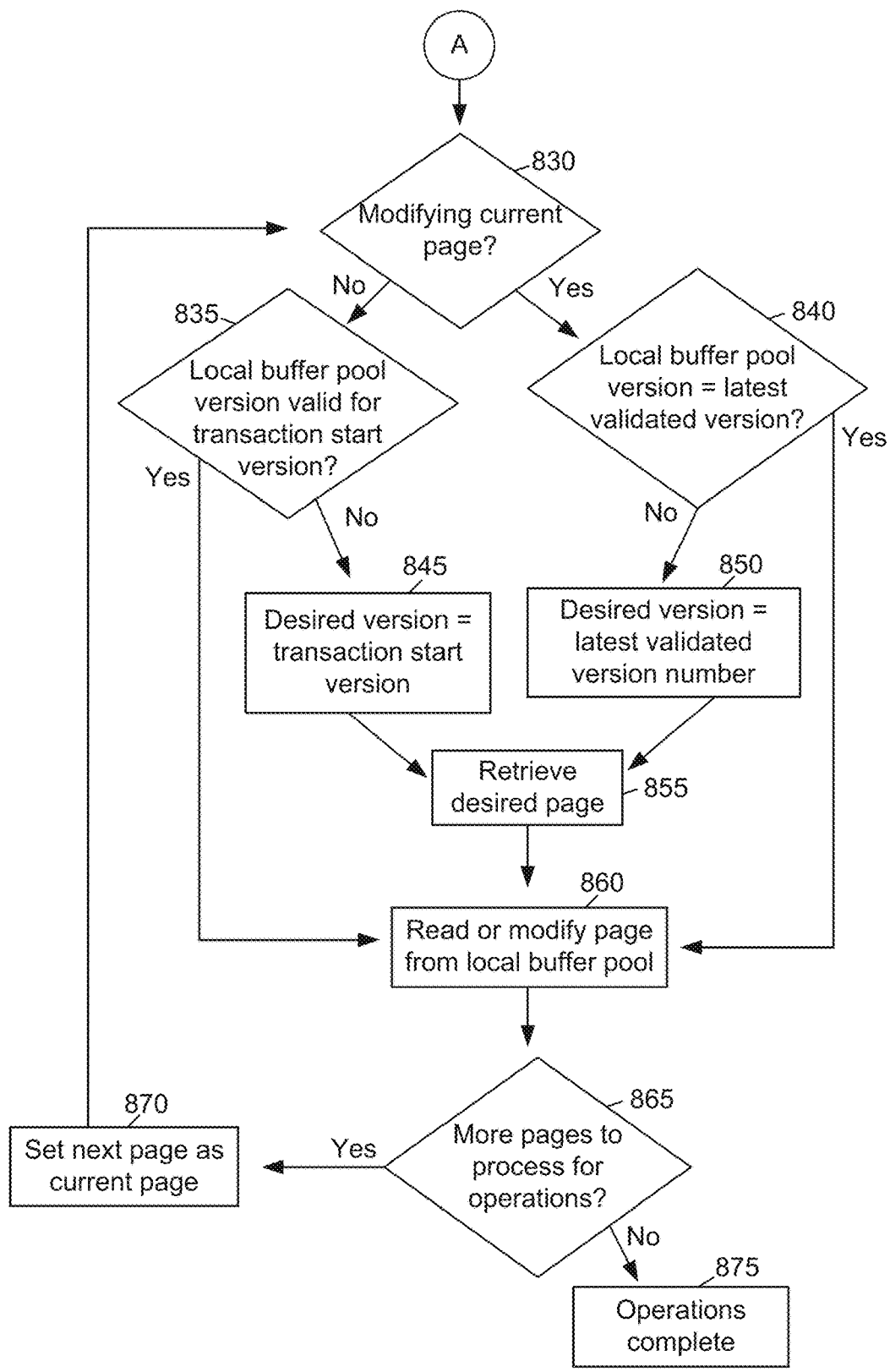

FIGS. 8A and 8B are a flow diagram of a method 800 for processing modify operations according to one or more illustrative aspects of the disclosure. In one or more embodiments, the method 800 or one or more steps thereof may be performed by the database management system 218 of the processing nodes 210 or the database management system 228 of the processing node 220. The method 800 or one or more steps thereof may be embodied in computer-executable instructions that are stored in a non-transitory computer-readable medium, such as a mass storage device 104, loaded into memory 108 and executed by CPU 114 of the computing device 100 implementing the processing nodes 210 or 220. Some steps or portions of steps in the flow diagram may be omitted or changed in order.

The method 800 may be performed by the database management system 218, 228 of one of the processing nodes 210 and 220 in order to perform modify operations on records of pages of the stored database 250. As described above, the processing nodes 210 and 220 may comprise local buffer pools 213 and 223, respectively. When performing modify operations on records of pages stored in the stored database 250, it may be more efficient for the processing nodes 210 and 220 to perform modify operations on records stored in the local buffer pools 213 and 223 than for the processing nodes 210 and 220 to retrieve records from the storage nodes 240 each time the processing nodes 210 and 220 perform a modify operation on record of a page.

At step 805 requests to perform modify operations may be received. The pages on which the modify operations are being performed on may also be received and stored in the local log buffers 213, 225. The requests may each correspond to a transaction. The pages on which the modify operations are being performed on are retrieved from the stored database 250. The requests may be received from one of the user nodes 203 or 205.

At step 810 a global page change list may be received. The global page change list may be received from the common log node 235. The global page change list may comprise indications of one or more page updates validated by the common log 230. The global page change list may indicate the latest validated version number for various pages, such as pages that have been recently updated. For example, when the processing node 220 transmits an modify operation to the common log node 235, the common log 230 may validate the modify operation, and if the common log 230 determines that the modify operation does not cause any conflicts, the common log node 235 may transmit, in the global page change list, the latest validated version number of the page corresponding to the modify operation. The global page change list may be transmitted periodically or at any interval. Multiple global page change lists may be received while the method 800 is executed.

At step 815 a single maximum version number of all pages in the stored database 250 may be determined, which may be referred to as the "transaction start version." The transaction start version may be requested from the common log node 235. The common log 230 may determine the transaction start version and transmit the transaction start version to a processing node 210 or 220. The transaction start version may be the version number of a page in the stored database 250 that has the highest version number of any page in the stored database 250.

At step 820 pages corresponding to the modify operations received at step 805 may be determined. The pages corresponding to the operations may comprise pages that are modified while processing, or executing, the modify operations. The pages corresponding to the modify operations may comprise pages that are used by the processing node 210 or 220 during execution of the modify operations. A page list may be generated, where the page list comprises page numbers of all pages that will be modified while performing the modify operations.

At step 825 the page list may be traversed iteratively, beginning with a first page in the list as the current page. The page list may be traversed in any order. Any page in the list may be chosen as the current page, regardless of position in the list. After selecting the current page from the page list, the current page may be removed from the page list.

At step 830 a determination may be made as to whether a modify operation is modifying the current page. If the current page is being modified, the method 800 may use the latest validated version of the page as the base version for the modify operation, otherwise a conflict may occur as described above in regards to steps 330 and 335 of FIG. 3. If the current page is not being modified, such as if the current page is being read but no modify operation is being performed on the current page, an older version of the current page may be used. For example, if database snapshotting is used by the storage nodes 240, the older version of the current page may be used for a page read. The page read may be performed more quickly if an older version of the current page may be used, instead of the latest validated version of the current page.

If, at step 830, a determination is made that the current page is being modified, a determination may be made at step 840 as to whether the latest validated version of the current page is stored in a local buffer pool 213 or 223 of the processing node 210 or 220 that is executing the modify operation. As described above at step 810, the global page change lists may indicate the latest validated version numbers of one or more pages. The processing nodes 210 and 220 may periodically receive global page change lists. The latest validated version number of the current page may be determined based on the global page change lists. If, at step 840, a determination is made that the latest validated version of the current page is stored in the local buffer pool 213 or 223 of the node executing the modify operation, the latest validated version of the current page will be read or updated from the local buffer pool at step 860.

If, at step 840, it is determined that the local buffer pool version number of the current page does not match the latest validated version number of the current page, a desired version number may be set to the latest validated version number of the page. At step 855 the page corresponding to the desired version number of the current page may be retrieved from the storage nodes 240. To retrieve the desired version number of the current page, the processing node 210 or 220 may transmit a request to the storage nodes 240. The database storage component 240 may retrieve the desired version of the current page from the stored database 250. The storage nodes 240 may transmit the desired version of the current page to the requesting processing node 210 or 220.

If, at step 830, a determination is made that the modify operation is not modifying the current page, at step 835 the version number of the current page stored in the relevant local buffer pool 213 or 223 may be compared to the transaction start version determined at step 815. If, at step 835, the version number of the current page stored in the relevant local buffer pool is not valid for the transaction start version, the current page will be read from the local buffer pool at step 860.

If, at step 835, either the current page is not stored in the local buffer pool or the version number of the current page stored in the local buffer pool is greater than the transaction start version, at step 845 the desired version number of the page is set to the transaction start version determined at step 815.

The current page is retrieved, based on the desired version number, at step 855. At step 855, a page having a version number that is less than or equal to the desired version number may be retrieved. The highest existing version number of the current page, that is less than or equal to the desired version number, may be retrieved. For example, if a version of the current page matching the desired version number does not exist, the highest version number of the current page that is less than the desired version number may be retrieved.

At step 855 a request may be transmitted to the storage nodes 240 for the desired version number of the current page. Instead of or in addition to including a desired version number, the request may indicate that the latest validated version of the current page is requested. For example, a flag in the request may indicate that the latest validated version of the current page is requested. The storage nodes 240 may determine the highest validated version number of the current page that is less than or equal to the desired version number, and may return that version of the current page. If the flag is set indicating that the latest validated version of the current page is requested, the storage nodes 240 may return the latest validated version of the current page. The page retrieved at step 855 may be stored in the local buffer pool 213 or 223.

At step 860 the current page may be read and/or modified from the local buffer pool. The page modification may be performed based on the page received at step 805. At step 865 a determination may be made as to whether there are more pages in the page list to process for the modify operations. If no more pages remain in the page list, the modify operations may be considered completed at step 875. If more pages remain in the page list, a next page may be selected as the current page at step 870. Any page in the page list may be selected as the next page. After selecting the next page as the current page, the page number of that page may be removed from the page list. The method may then proceed to step 830, to determine whether the current page is being modified.

Although not illustrated in FIG. 8, in certain instances, page read operations may use the latest validated version of the current page, rather using an older version of the current page. For example, if database snapshotting is not supported and/or implemented by the storage nodes 240, page read operations may use the latest validated version of the current page. In that case, after step 830, regardless of whether the page is being modified or not, the method 800 may continue at step 840 where a determination is made as to whether the latest validated version is in the local buffer pool.

As described above, conflicts often occur when multiple processing nodes access a same database system. Conflicts are particularly likely in a database system when there are communication delays between processing nodes and storage nodes. The common log node described herein may prevent conflicts from occurring when multiple processing nodes attempt to concurrently write to a same record of a page in a database system. The common log node described herein may minimize any processing delays that occur due to the conflict detection.

Although example embodiments are described above, the various features and steps may be combined, divided, omitted, rearranged, revised or augmented in any desired manner, depending on the specific outcome or application. Various elements herein have been described as "A and/or B," which is intended to mean any of the following "A or B," "A and B," "one or more of A and one or more of B." Various alterations, modifications, and improvements will readily occur to those skilled in the art. Such alterations, modifications, and improvements as are made obvious by this disclosure are intended to be part of this description, though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A method comprising:
   receiving, by a common log node and from a processing node, a request to perform a modify operation on a record of a page of a database, the request comprising:
      an identifier of the page,
      a version number indicating which version of the page was used when generating the modify operation, and
      an identifier of a transaction corresponding to the modify operation;
   determining, by the common log node, whether a lock corresponding to the page has been assigned;
   after determining that the lock has been assigned, determining, by the common log node, whether the lock is assigned to the processing node, the lock comprising a transaction list of pending transactions from the processing node;
   comparing, by the common log node, the version number to a latest validated version number of the page;
   after determining that the lock has been assigned to the processing node and that the version number is equivalent to the latest validated version number, transmitting, by the common log node, an indication that the modify operation has been validated;
   receiving, by the common log node and from the processing node, an indication that the transaction has been committed;
   removing, by the common log node, the transaction from the transaction list
   determining, by the common log node, whether the transaction list is empty; and
   after determining that the transaction list is empty, deleting, by the common log node, the lock.

2. The method of claim 1, further comprising adding, by the common log node, the identifier of the transaction to the transaction list.

3. The method of claim 2, wherein the lock comprises:
   the identifier of the page; and
   an indication of the processing node.

4. The method of claim 1, wherein the version number comprises an indication of a processing node that previously modified the page.

5. The method of claim 1, further comprising:
   receiving, by the common log node and from the processing node, a second request to perform a second modify operation on a record of a second page of the database, wherein the second request comprises a version number of the second page indicating which version of the page was used when generating the second modify operation;
   comparing, by the common log node, the version number of the second page to a latest validated version number of the second page; and
   after determining that the version number of the second page is different from the latest validated version number of the second page, transmitting, by the common log node and to the processing node, an indication that the second modify operation has failed validation.

6. The method of claim 1, further comprising:
   receiving, by the common log node and from a second processing node, a request to perform a second modify operation on the record of the page;

determining, by the common log node, that the lock corresponding to the page has been assigned to the processing node; and in response to determining that the lock has been assigned to the processing node, transmitting, by the common log node and to the second processing node, an indication that the second modify operation has failed validation.

7. The method of claim 1, further comprising transmitting, by the common log node, to a storage node, and based on the request to perform the modify operation, an update to the record of the page.

8. A method comprising:
receiving, by a common log node and from a processing node, a request to perform an operation on a record of a page of a database, the request comprising:
an identifier of the page,
a version number indicating which version of the page was used when generating the operation, and
an identifier of a transaction corresponding to the operation;
determining whether a lock corresponding to the page has been assigned to the processing node, the lock comprising a transaction list of pending transactions from the processing node;
after determining that the lock has been assigned to the processing node, comparing the version number to a latest validated version number of the page;
after determining that the version number is different from the latest validated version number, transmitting an indication that the operation has failed validation
determining, by the common log node, whether the transaction list is empty; and
after determining that the transaction list is empty, deleting, by the common log node, the lock.

9. The method of claim 8, further comprising receiving, by the common log node and from the processing node, an instruction to reverse the transaction.

10. The method of claim 9, further comprising:
determining a plurality of locks corresponding to the transaction;
determining a plurality of page numbers corresponding to the plurality of locks; and
for each page number of the plurality of page numbers, reversing page updates corresponding to the transaction.

11. A method comprising:
receiving, by a common log node and from a processing node, a request to perform a modify operation on a record of a page of a database, the request comprising:
an identifier of the page,
a version number indicating which version of the page was used when generating the modify operation, and
an identifier of a transaction corresponding to the modify operation;
determining, by the common log node, whether a lock corresponding to the page has been assigned;
creating, by the common log node, the lock corresponding to the page, the lock comprising a transaction list of pending transactions from the processing node;
comparing, by the common log node, the version number to a latest validated version number of the page;
after determining that the version number is equivalent to the latest validated version number, transmitting, by the common log node and to the processing node, an indication that the modify operation has been validate& receiving, by the common log node and from the processing node, an indication that the transaction has been committed;
removing, by the common log node, the transaction from the transaction list
determining, by the common log node, whether the transaction list is empty; and
after determining that the transaction list is empty, deleting, by the common log node, the lock.

12. The method of claim 11, further comprising transmitting, to a storage node and based on the request to perform the modify operation, an update to the record of the page.

13. The method of claim 12, wherein the request to perform the modify operation on the record of the page of the database comprises the update to the record of the page.

14. The method of claim 11, further comprising:
receiving, from the processing node, a request for a second page of the database;
determining a latest validated version number of the second page;
retrieving data corresponding to the latest validated version number of the second page; and
transmitting, to the processing node, the data.

15. The method of claim 11, further comprising:
receiving, by the common log node, a second request to perform a second modify operation on a record of a second page of the database, wherein the second request comprises a version number of the second page indicating which version of the second page was used when generating the second modify operation;
comparing the version number of the second page to a latest validated version number of the second page; and
after determining that the version number of the second page is different from the latest validated version number of the second page, transmitting an indication that the second modify operation has failed validation.

16. The method of claim 11, further comprising
receiving, from a second processing node, a request to perform a second modify operation on the record of the page;
determining that the lock corresponding to the page has been assigned to the processing node; and
after determining that the lock has been assigned to the processing node, transmitting an indication that the second modify operation has failed validation.

17. The method of claim 11, further comprising adding the identifier of the transaction to the transaction list.

18. The method of claim 17, wherein the lock comprises:
the identifier of the page; and
an indication of the processing node.

19. A method comprising:
Receiving, by a common log node and from a processing node, a request to perform a modify operation on a record of a page of a database, the request comprising:
an identifier of the page,
a version number indicating which version of the page was used when generating the modify operation, and
an identifier of a transaction corresponding to the modify operation;
determining, by the common log node, whether a lock corresponding to the page has been assigned;
creating, by the common log node, the lock corresponding to the page, the lock comprising a transaction list of pending transactions from the processing node;
comparing, by the common log node, the version number to a latest validated version number of the page;

after determining that the version number is different from the latest validated version number, transmitting, by the common log node and to the processing node, an indication that the modify operation has failed validation;

determining, by the common log node, whether the transaction list is empty; and after determining that the transaction list is empty, deleting, by the common log node, the lock.

20. A method comprising:

receiving, by a common log node and from a processing node, a request to perform a modify operation on a record of a page of a database, the request comprising:
an identifier of the page,
a version number indicating which version of the page was used when generating the modify operation, and
an identifier of a transaction corresponding to the modify operation;

determining, by the common log node, whether a lock corresponding to the page has been assigned, the lock comprising a transaction list of pending transactions from the processing node;

after determining that the lock has been assigned, determining, by the common log node, whether the lock is assigned to the processing node;

after determining that the lock was not assigned to the processing node, transmitting, by the common log node and to the processing node, an indication that the modify operation has failed validation;

determining, by the common log node, whether the transaction list is empty; and after determining that the transaction list is empty, deleting, by the common log node, the lock.

* * * * *

UNITED STATES PATENT AND TRADEMARK OFFICE
CERTIFICATE OF CORRECTION

PATENT NO. : 11,640,383 B2  
APPLICATION NO. : 16/192514  
DATED : May 2, 2023  
INVENTOR(S) : Xun Xue et al.

Page 1 of 1

It is certified that error appears in the above-identified patent and that said Letters Patent is hereby corrected as shown below:

In the Claims

Column 20, Claim 1, Line 34 should read: --the transaction list;--
Column 21, Claim 11, Line 67 should read: --the modify operation has been validated--
Column 22, Claim 11, Line 5 should read: --the transaction list;--

Signed and Sealed this
Eleventh Day of July, 2023

Katherine Kelly Vidal
*Director of the United States Patent and Trademark Office*